United States Patent Office 3,110,639
Patented Nov. 12, 1963

3,110,639
ROCKET PROPELLANTS CONTAINING TETRAETHYLENEPENTAMINENITRATE
John D. Clark, Kinnelon, and Michael E. Walsh, Morris Plains, N.J., assignors to the United States of America as represented by the Secretary of the Navy
No Drawing. Filed Feb. 28, 1957, Ser. No. 643,203
3 Claims. (Cl. 149—47)
(Granted under Title 35, U.S. Code (1952), sec. 266)

The invention described herein may be manufactured and used by or for the Government of the United States of America for governmental purposes without the payment of any royalties thereon or therefor.

This invention relates to a solid propellant for rocket motors.

Modern military operations are becoming more dependent upon rocket motors. The very nature of the operations require a motor that will give high and reliable performance so that lives will not be lost. A rocket motor is heavily dependent on a reliable propellant. The most reliable is a solid propellant since once ignited it will continue to burn until it is consumed. This invention provides a solid rocket propellant that is capable of high and reliable performance.

One of the difficulties in the manufacture of solid composite propellants is the working of enough oxidizer into the fuel matrix. In the past, extreme difficulty has been encountered in the synthesis of poly-nitro compounds as solid propellants. Also, such synthesis is very dangerous. This invention proposes the use of nitrate salts of poly-amines as a propellant for rocket motors. The performance of these salts is greatly increased by the addition to the salt of a solid oxidizer such as ammonium nitrate or ammonium perchlorate.

It is an object of this invention to provide a nitrate salt of a poly-amine as a solid propellant for rocket motors.

It is a further object of this invention to provide a nitrate salt of a poly-amine mixed with a solid oxidizer salt as a solid propellant for rocket motors.

Other objects and many of the attendant advantages of this invention will be readily appreciated as the same becomes better understood by reference to the following detailed description:

The invention consists of a solid propellant for rocket motors of the type of a nitrate salt of a polyamine. In particular excellent results have been obtained from the salt, tetraethylenepentaminenitrate. The structural formula for the salt is:

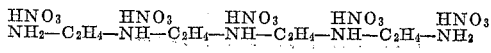

An increase in performance is attained with the addition of oxidizer salts such as ammonium nitrate and ammonium perchlorate. The following table shows the advantage of adding an oxidizer salt to the tetraethylenepentaminenitrate,

| Propellant | Percent Oxidizer | Specific Impulse (Calculated at: Chamber pressure 1,000 p.s.i., Exhaust pressure 14.7 p.s.i.) |
|---|---|---|
| | | sec. |
| Tetraethylenepentaminenitrate | 0 | 215 |
| Tetraethylenepentaminenitrate + ammonium nitrate | 32 | 232 |
| Tetraethylenepentaminenitrate + ammonium perchlorate | 32 | 246 |

The tetraethylenepentaminenitrate presents five nitric acid groups attached to the amine so that the matrix of itself possesses considerable oxidizing potential. This is further increased by the addition of the oxidizing salts. Although tetraethylenepentaminenitrate is given as an example, the invention is not limited thereto. The salts of polyamines with longer or shorter chain lengths, or mixtures, produce comparable results.

Obviously many modifications and variations of the present invention are possible in the light of the above teachings. It is therefore to be understood that within the scope of the appended claims the invention may be practiced otherwise than as specifically described.

What is claimed is:

1. A rocket propellant composition which will be readily ignitable and which will continue to burn once it is ignited until it is consumed, said composition consisting of at least 68% by weight of tetraethylenepentaminenitrate and 32% by weight of an oxidizer salt selected from the group consisting of ammonium nitrate, and ammonium perchlorate.

2. A composition according to claim 1 comprising 68% by weight of tetraethylenepentaminenitrate and 32% by weight of ammonium perchlorate.

3. A composition according to claim 1 comprising 68% by weight of tetraethylenepentaminenitrate and 32% by weight of ammonium nitrate.

References Cited in the file of this patent
UNITED STATES PATENTS
2,739,981   Szabo _____ Mar. 27, 1956